(12) United States Patent
Balestra

(10) Patent No.: US 7,689,076 B1
(45) Date of Patent: Mar. 30, 2010

(54) OPTICAL COMMUNICATIONS SYSTEM AND METHOD FOR OPTIMIZING AN OPTICAL COMMUNICATIONS SYSTEM

(75) Inventor: Chester L. Balestra, University City, MO (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 12/389,589

(22) Filed: Feb. 20, 2009

(51) Int. Cl.
*G02B 6/32* (2006.01)

(52) U.S. Cl. ........................................................ 385/33

(58) Field of Classification Search ............. 385/33–35, 385/3
See application file for complete search history.

(56) References Cited

U.S. PATENT DOCUMENTS

| 6,414,931 | B1 * | 7/2002 | Maeda et al. | 369/112.24 |
| 7,151,882 | B2 | 12/2006 | Suzuki et al. | |
| 7,310,473 | B2 | 12/2007 | Kim et al. | |

* cited by examiner

*Primary Examiner*—Sung H Pak
*Assistant Examiner*—Eric Wong
(74) *Attorney, Agent, or Firm*—Armstrong Teasdale LLP

(57) ABSTRACT

An optical communications system includes a focal element configured to transmit a signal, an aperture configured to focus the signal onto the focal element, and a phase change layer positioned on at least a portion of a surface of the aperture, wherein the phase change layer is configured to shift a phase of the signal.

20 Claims, 3 Drawing Sheets

US 7,689,076 B1

OPTICAL COMMUNICATIONS SYSTEM AND METHOD FOR OPTIMIZING AN OPTICAL COMMUNICATIONS SYSTEM

BACKGROUND

The field of the disclosure relates generally to optical communications systems, and more particularly to a system and method for optimizing fiber to aperture coupling within an optical antenna.

Known optical communications systems conduct communications by transmitting optical signals through optical fibers. Conventional optical communications are configured to transmit optical signals through the use of lasers by causing total internal reflection of laser beams within an optical fiber along an aperture-to-fiber optical path.

However, in conventional transmission of these signals, the occurrence of phase reversal in such optical communications systems, and more specifically in the aperture pattern at the fiber, and/or fiber pattern at the aperture, is generally accepted as a constraint of the optimum coupling coefficient determination. Such a phase reversal results in a negative and/or subtractive contribution to the overall coupling coefficient.

Scalar diffraction integral equations are conventionally used for analysis and design of optical communication systems. Such analyses do not fully address the vector characteristics of an electromagnetic wave signal and how it couples to a source or receiver element, such as a fiber optic waveguide. Thus calculating an optimum coupling coefficient by conventional means is less than ideal. The scalar equations are a basis for accurate design for optical communication applications.

SUMMARY

Accordingly there is a need to enhance the attributes of the coupling of power into the fiber an optical communication system. One exemplary embodiment is directed to an optical communications system. The system includes a focal element configured to transmit a signal, an aperture configured to focus the signal onto the focal element, and a phase change layer positioned on at least a portion of a surface of the aperture, wherein the phase change layer is configured to shift a phase of the signal.

Another exemplary embodiment is directed to a phase reversal apparatus for an optical communications system, wherein the optical communications system includes a focal element configured to transmit a signal, and an aperture configured to focus the signal onto said focal element. The phase reversal apparatus includes a phase change layer positioned on at least a portion of a surface of the aperture, wherein the phase change layer is configured to shift a phase of at least a portion of the signal.

Yet another exemplary embodiment is directed to a method for optimizing an optical communications system, wherein the method includes receiving a signal at an aperture, transmitting the signal onto a focal element positioned at a focus of the aperture, and shifting a phase of at least a portion of the signal using a phase change layer positioned on at least a portion of a surface of said aperture.

Various refinements exist of the features noted in relation to the above-mentioned aspects of the present invention. Additional features may also be incorporated in the above-mentioned aspects of the present invention as well. These refinements and additional features may exist individually or in any combination. For instance, various features discussed below in relation to any of the illustrated embodiments of the present invention may be incorporated into any of the above-described aspects of the present invention, alone or in any combination.

BRIEF DESCRIPTION OF THE DRAWINGS

Non-limiting and non-exhaustive embodiments are described with reference to the following figures, wherein like reference numerals refer to like parts throughout the various views unless otherwise specified.

DETAILED DESCRIPTION

One or more specific embodiments of the present invention are described herein. In an effort to provide a concise description of these embodiments, all features of an actual implementation may not be described in the specification.

Figure 1:
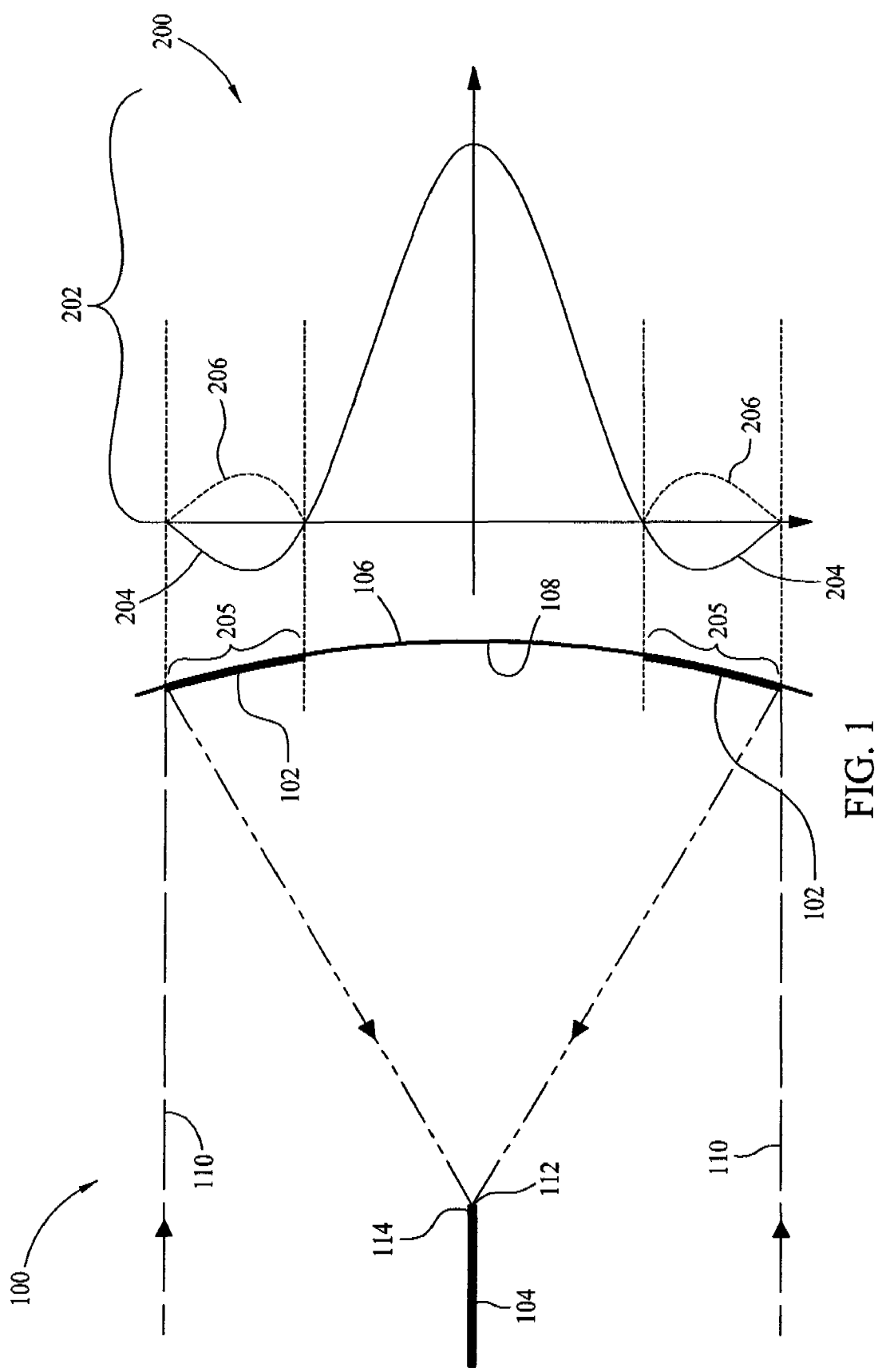
FIG. 1 is a schematic illustration of an exemplary optical communications system that includes a phase reversal layer, and a graphical illustration of a cross sectional amplitude of a portion of incoming light measured within the exemplary optical communications system.

FIG. 1 is a schematic illustration of an exemplary optical communications system 100 that includes a phase change layer 102. More specifically and in the exemplary embodiment, communications system 100 includes a focal element 104 that transmits an optical signal, an aperture 106 used to focus the signal onto focal element 104, and a phase change layer 102 positioned on at least a portion of a surface 108 of aperture 106. In the exemplary embodiment, aperture 106 is a parabolic mirror that reflects beams of incoming light 110 to a focal point 112, and focal element 104 is an optical fiber having an end 114 that is positioned at aperture focal point 112. Alternatively focal element 104 may be any type of transmission device that enables optical communications system 100 to function as described herein.

In the exemplary embodiment, phase change layer 102 is a high refractive index material that generates a phase lag in light 110 being transmitted to, and reflected from, aperture surface 108. In the exemplary embodiment, phase change layer 102 is of an effective thickness approximately equal to a quarter of a wavelength of the incoming light 110 in order to produce a phase lag of 180 degrees relative to what the light reflected by this portion of surface 108 would have had in the absence of phase layer 102. Alternatively, phase change layer 102 may have any thickness that enables optical communications system 100 to function as described herein, such as for example a quarter of a wavelength of the incoming light 110, or some other net fractional wavelength of the incoming light 110 that maximizes the amount of coupling between aperture 106 and focal element 104. In an alternative embodiment, phase change layer 102 may be any type of element that generates the phase lag, as described in more detail herein, and that enables optical communications system 100 to function as described herein.

Also shown in FIG. 1 is a graph 200 illustrating an amplitude 202 of a portion of an at-the-aperture diffraction pattern of light emitted from focal element 104 and measured within the exemplary optical communications system 100. Without phase change layer 102 a negative phase 204 will be generated at a portion 205 of aperture 106. During operation, adding a phase reversal layer, such as for example phase change layer 102, to portion 205 of aperture 106 producing a positive amplitude 206 from the diffraction pattern of an optical fiber from focal point 112 results in a greater amount of incident power arriving at aperture 106 to be coupled at focal point 112 through end 114 into focal element 104. More specifically and in the exemplary embodiment, adding a phase reversal layer will cause that section to produce a negative phase 204 resulting in a better match for the fiber and aperture modal patterns and a consequently greater amount of coupling of the power at the aperture into focal element 104.

In the exemplary embodiment, focal element 104, such as for example an optical fiber, transmits a propagating wave whose transverse amplitude distribution must conform to its characteristic mode, or modes. For a single mode optical fiber, such as is typically used in high performance optical communication systems, there is only one mode. The three dimensional mode amplitude and phase distributions may be determined from a solution of Maxwell's equations for focal element 104 or guided wave device. For a received signal focused from aperture 106 to focal element 104, such as for example a waveguide, an optic fiber and/or an interface, only the portion of the incident signal wave front that conforms to the transverse distribution of the waveguide mode may couple into the waveguide. The remaining portion of the signal, and corresponding signal energy, is back scattered away from the waveguide. This backscattered portion is wasted signal energy. The portion of total power incident at the aperture that is coupled into the waveguide can be determined by calculating the integral of the vector dot product of a normalized version of the waveguide mode $M_{guide}$ and the focused aperture pattern $M_{aperture}$ evaluated over the entire guiding cross section of the guide. The square of the absolute value of this integral, as stated in equation (1) is the amount of power coupled into this guide.

$$\text{Coupled Power} = |\iint M_{guide} \cdot M_{aperture} dA|^2 \quad (1)$$

Since the focus-aperture optical communications system 100 is reciprocal, the same value of coupling coefficient may be calculated at any surface including a fiber interface, such as for example focal point 112, aperture surface 108, and at any location therebetween. Since incident light passes through aperture 106, the at-the-aperture orthonormal mode function $M_{aperture}$ (x,y) is a constant equal to the inverse of the square root of the area of aperture 106. The waveguide mode at aperture 106 can be calculated from the diffraction integral evaluated at the parabolic mirror aperture surface, as exemplified in, for example, equation (2) for a coaxial parabolic mirror optical antenna.

$$M_{guide}(x, y) = \hat{x} \frac{16f^3}{\lambda(4f^2 + x^2 + y^2)^2} \iint M_{guide}(x', y') \exp\left(j\frac{k}{f}(xx' + yy')\right) dx' dy' \quad (2)$$

$M_{guide}(x',y')$ is the waveguide mode at waveguide interface plane; $M_{guide}(x,y)$ is the diffracted waveguide mode at the aperture plane; $j=\sqrt{-1}$ is the imaginary unit; f is the focal length of the parabolic mirror; $\lambda$ is the wavelength of the optical signal and $k=2\pi/\lambda$. $M_{guide}(x',y')$ is determined by the geometry and material characteristics, such as refractive index distribution, of the focal element. Consistent with reciprocity, coupled power may also be determined by evaluating equation (1) at the aperture from the values of $M_{guide}$ and $M_{aperture}$ at the aperture.

Figure 2:
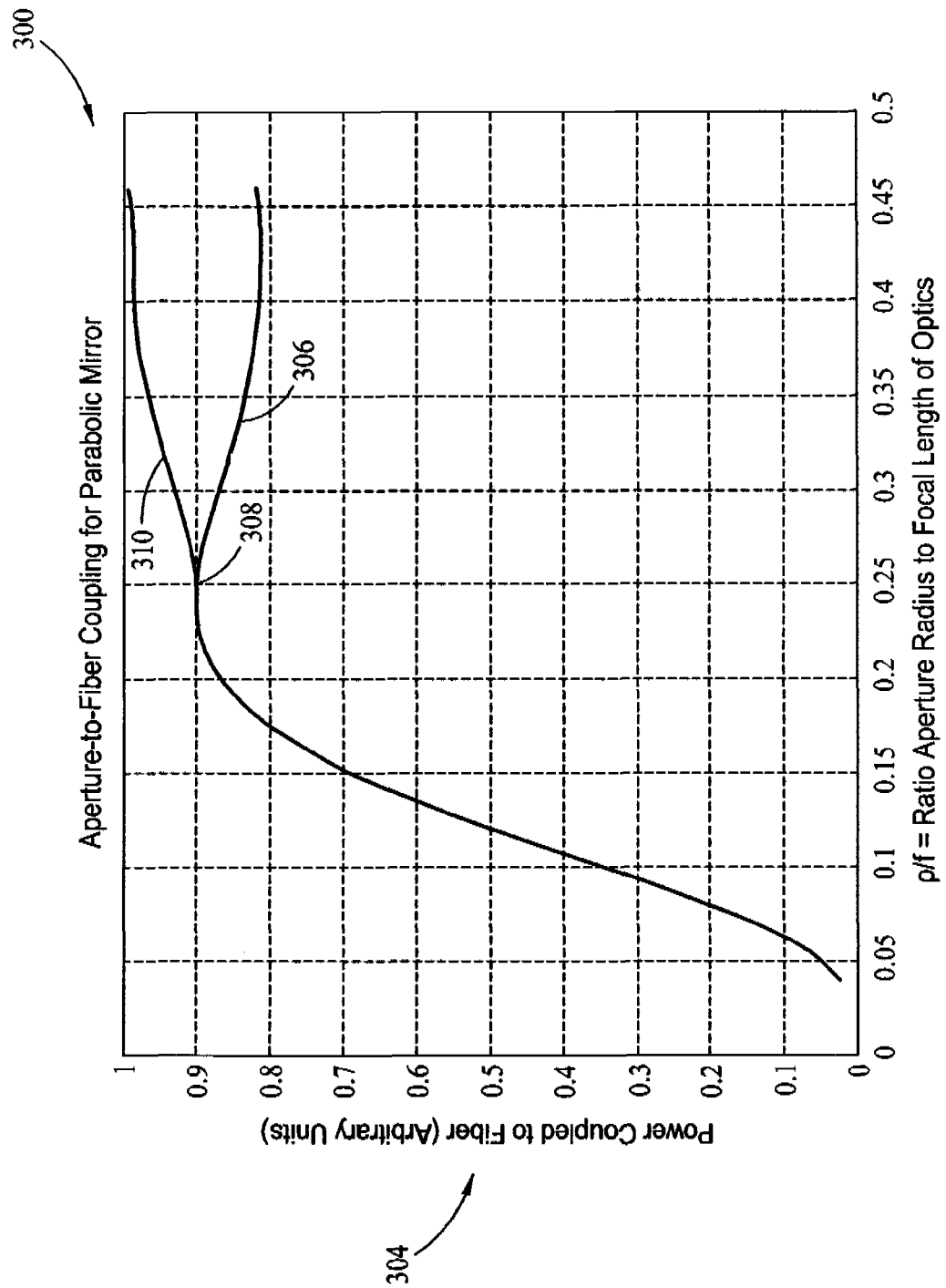
FIG. 2 is a graph illustrating an amount of received power coupled to a focal element, i.e. aperture as a function of an aperture radius to focal length ratio for the exemplary communications system shown in FIG. 1.

FIG. 2 is a graph 300 illustrating power 304 coupled to a fiber, such as focal element 104, as a function of an aperture radius to focal length ratio 302 for exemplary communications system 100 shown in FIG. 1. FIG. 2 illustrates the results of an exemplary phase reversal simulation performed for a step index optical fiber placed at the focal point 112 of aperture 106 (shown in FIG. 1). By applying equation (2) the amplitude pattern, $M_{guide}$ at aperture 106 was calculated and tabulated. An overlap integral, such as shown in equation (1) of the product of $M_{guide} \cdot M_{aperture}$, was calculated, where a uniform amplitude distribution $M_{aperture}$ was assumed for a typical received beam incident at aperture 106.

As shown in FIG. 2 and referring specifically to curve 306, the power coupled to the fiber increases with aperture size up to about an aperture radius of about 0.25 focal lengths, denoted at point 308. As radius (diameter) increases the amount of power coupled decreases due to a phase reversal in the fiber mode pattern at the aperture occurring in the region of greater aperture radius. Now referring to curve 310 and in the exemplary embodiment, when a phase reversal layer, such as phase change layer 102 shown in FIG. 1, is placed over the corresponding region of fiber pattern phase reversal, the total amount of coupled power increases with increased aperture size, or actually increased aperture-to-focal length ratio. For the example depicted in FIG. 2, an increase of about 20% in coupled power can be achieved relative to what would ordinarily be obtained from a non phase compensated mirror.

As shown in equation (3) which states the vector amplitude E(r) from an x-polarized source s(x', y'), described at an aperture plane:

$$E(r) = (\hat{\theta}\cos\phi - \hat{\phi}\sin\phi)\frac{(1+\cos\theta)}{2} \quad (3)$$

$$\frac{\exp(-jkr)}{\lambda r} \iint s(x', y')\exp\left(j\frac{k}{r}(xx' + yy')\right)dx'dy' \rightarrow$$

$$\pi(\hat{\theta}\cos\phi - \hat{\phi}\sin\phi)(1 + \cos\theta)\frac{\exp(-jkr)}{\lambda r}$$

$$\int f(\rho')J_0(k\sin\theta\rho')\rho'd\rho' \text{ for } s(x', y') = f(\rho')$$

in terms of a diffraction integral, the magnitude of E(r) is dependent on magnitude and sign of s(x', y') as it is distributed over the aperture plane. This electric far field wave front is stated in terms of far field spherical coordinates r,θ,φ and corresponding unit vectors $\hat{\theta}$ and $\hat{\phi}$; and (x', y') are rectangular coordinates at the aperture plane, while x and y are their counterparts in the far field. It is readily apparent for the typical cylindrical symmetry case, stated in the lower portion of equation (3), that a larger magnitude integral results if the integrand maintains the same sign over the region of integration. Thus any phase corrector that can provide this feature results in a corresponding optimization of far field amplitude.

Figure 3:
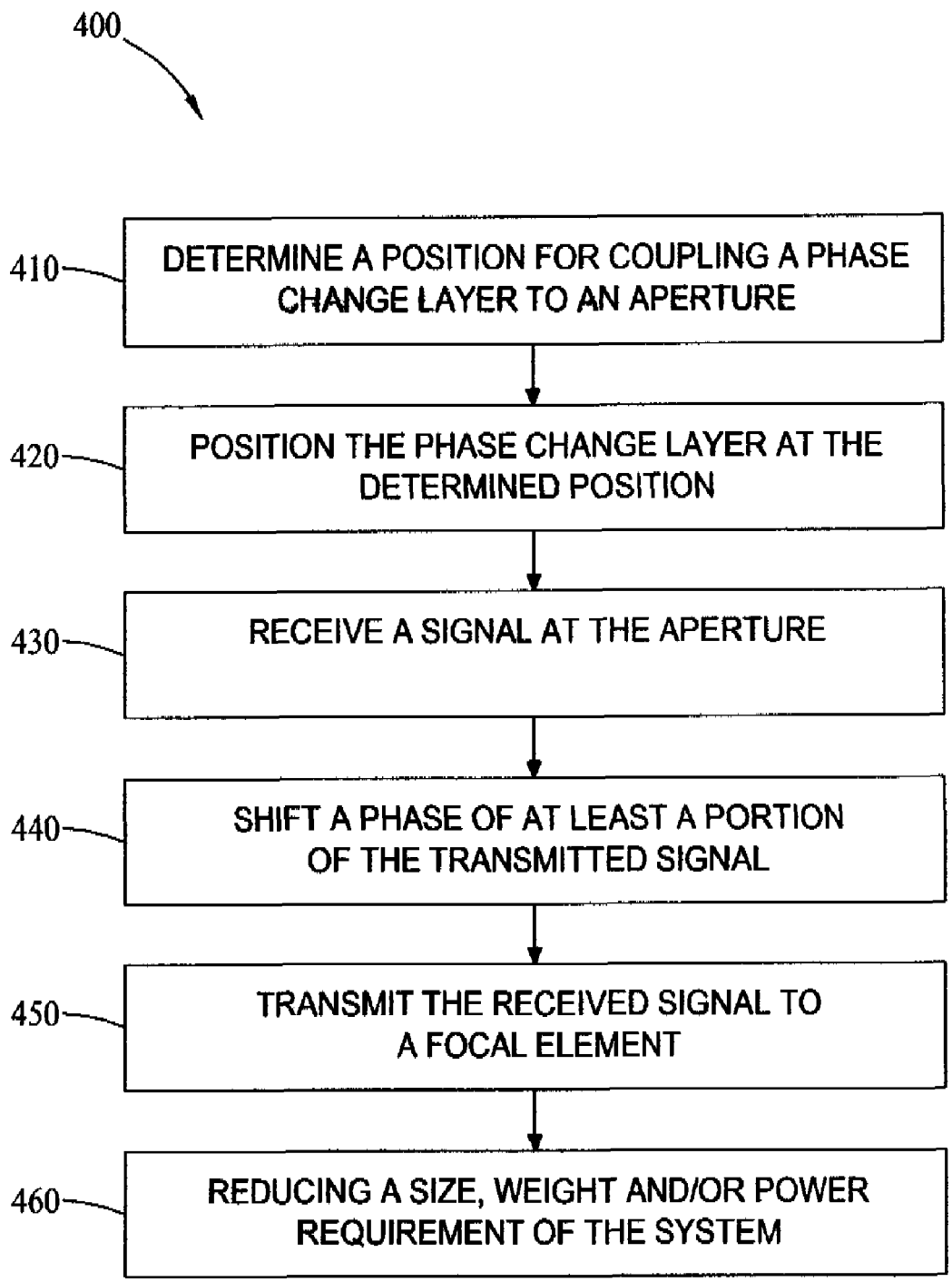
FIG. 3 is a flow diagram of an exemplary method of optimizing an optical communications system.

FIG. 3 is a flow diagram of an exemplary method 400 for optimizing an optical communications system. Method 400 includes determining 410 a position for coupling a phase change layer to an aperture such that the transmitted signal is optimized, and positioning 420 the phase change layer at the determined position. Furthermore and in the exemplary embodiment, method 400 includes receiving 430 a signal at an aperture, shifting 440 a phase of at least a portion of the signal using a phase change layer positioned on at least a portion of a surface of said aperture, and transmitting 450 the signal onto a focal element positioned at a focus of the aperture. In the exemplary embodiment, shifting 440 a phase of at least a portion of the signal wavefront includes generating a phase lag in light reflected from the aperture using a high refractive index material, wherein generating a phase lag further comprises generating a net phase lag of 180 degrees, or some other angle less than 360 degrees depending upon the at-the-aperture diffraction pattern of the specific focal element in use. In an alternative embodiment, shifting 440 a phase of at least a portion of the signal includes transmitting an increased amount of incident power from the aperture focus using the phase change layer, to a far field target. In the exemplary embodiment, method 400 includes reducing 460 at least one of a size, weight and power requirement of the optical communications system.

The systems and methods described herein provide an exemplary phase reversal layer used in an optical communications system, i.e. the optical antenna described in more detail herein. The description should enable one of ordinary skill in the art to make and use the disclosure, and the description describes several embodiments, adaptations, variations, alternatives, and uses of the disclosure, including what is presently believed to be the best mode of carrying out the disclosure. The disclosure is described herein as being applied to a preferred embodiment, namely, an integrated inlet design.

Exemplary embodiments of optical communications systems are described in detail above. The above-described optical communications systems facilitate permitting more power to be coupled to the optical fiber for a given aperture size, or it permits aperture size to be reduced—resulting in a reduction of system size, weight, and power (SWaP) requirements for a given coupled power value. To increase power output, the systems and methods described herein provide an optical communication system with a greater signal-to-noise ratio, and/or a reduction in SWaP requirements which in turn could provide performance advances to the rest of the communications system. When the phase reversal layer is placed over the corresponding region of the aperture, the total amount of coupled power increases with respect to aperture size, or aperture-to-focal length ratio. An increase of about 20% in coupled power, for example, may be achieved relative to what would ordinarily be obtained from a non-phase compensated aperture.

Moreover, the system and methods described herein overcome many of the deficiencies realized in a non-phase compensated system. Although the foregoing description contains many specifics, these should not be construed as limiting the scope of the present disclosure, but merely as providing illustrations of some of the presently preferred embodiments. Similarly, other embodiments may be devised which do not depart from the spirit or scope of the present disclosure. Features from different embodiments may be employed in combination. The scope of the disclosure is, therefore, indicated and limited only by the appended claims and their legal equivalents, rather than by the foregoing description. All additions, deletions and modifications as disclosed herein which fall within the meaning and scope of the claims are to be embraced thereby.

Although the apparatus and methods described herein are described in the context of a phase reversal apparatus for an optical communications system, it is understood that the apparatus and methods are not limited to such applications. Likewise, the system components illustrated are not limited to the specific embodiments described herein, but rather, system components can be utilized independently and separately from other components described herein.

As used herein, an element or step recited in the singular and proceeded with the word "a" or "an" should be understood as not excluding plural elements or steps, unless such exclusion is explicitly recited. Furthermore, references to "one embodiment" of the present disclosure are not intended to be interpreted as excluding the existence of additional embodiments that also incorporate the recited features.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An optical communications system comprising:
   a focal element configured to transmit a signal;
   an aperture lens configured to focus the signal onto said focal element, said aperture lens comprising a surface; and
   a phase change layer positioned on at least a portion of said surface of said aperture lens, said phase change layer configured to shift a phase of the signal, producing a positive amplitude from a diffraction pattern from said focal element.

2. A system in accordance with claim 1 wherein said phase change layer comprises a high refractive index material configured to generate a phase lag in light reflected from said aperture lens.

3. A system in accordance with claim 2 wherein said phase change layer generates a net phase lag ranging from greater than about 0 degrees to about 360 degrees.

4. A system in accordance with claim 3 wherein said phase change layer generates a net phase lag of 180 degrees.

5. A system in accordance with claim 1 wherein said aperture lens comprises a parabolic mirror.

6. A system in accordance with claim 1 wherein said focal element comprises an optical fiber, said optical fiber positioned approximately at a focus of said aperture lens.

7. A system in accordance with claim 1 wherein said phase change layer is configured to change an incident power distribution of the signal transmitted from said aperture lens.

8. A phase reversal apparatus for an optical communications system including:
   a focal element configured to transmit a signal; and
   an aperture lens configured to focus the signal onto said focal element, said aperture lens comprising a surface, said phase reversal apparatus comprising a phase change layer positioned on at least a portion of said surface of said aperture lens, said phase change layer configured to shift a phase of at least a portion of the signal, producing a positive amplitude from a diffraction pattern from said focal element.

9. A system in accordance with claim 8 wherein said phase change layer comprises a high refractive index material configured to generate a phase lag in light reflected from said aperture.

10. A system in accordance with claim 8 wherein said phase change layer generates a net phase lag of an angle ranging from greater than about 0 degrees to about 360 degrees.

11. A system in accordance with claim 10 wherein said phase change layer generates a phase lag of 180 degrees.

12. A system in accordance with claim 8 wherein said aperture lens comprises a parabolic mirror.

13. A system in accordance with claim 8 wherein said focal element comprises an optical fiber, said optical fiber positioned approximately at a focus of said aperture lens.

14. A system in accordance with claim 8 wherein said phase change layer is configured to increase an incident power of the signal transmitted from said aperture lens.

15. A method for optimizing an optical communications system, said method comprising:

receiving a signal at an aperture lens, said aperture lens comprising a surface;

transmitting the signal onto a focal element positioned at a focus of the aperture lens; and shifting a phase of at least a portion of the signal using a phase change layer positioned on at least a portion of said surface of said aperture lens, producing a positive amplitude from a diffraction pattern from said focal element.

16. A method in accordance with claim 15 wherein shifting a phase of at least a portion the signal further comprises generating a phase lag in light reflected from the aperture lens using a high refractive index material, wherein the phase change layer generates the net phase lag of an angle ranging from greater than about 0 degrees to about 360 degrees.

17. A method in accordance with claim 16 wherein generating a phase lag further comprises generating a phase lag of 180 degrees.

18. A method in accordance with claim 15 further comprising:

determining a position for coupling the phase change layer to the aperture lens such that the transmitted signal is optimized; and positioning the phase change layer at the determined position.

19. A method in accordance with claim 18 further comprising reducing at least one of a size, weight and power requirement of the optical communications system.

20. A method in accordance with claim 15 wherein shifting a phase of at least a portion of the signal further comprises transmitting an increased coupling incident power to the aperture lens focus using the phase change layer.

* * * * *